United States Patent [19]

Naíto et al.

[11] 3,896,106

[45] July 22, 1975

[54] ANTIBIOTIC DERIVATIVES

[75] Inventors: Takayuki Naito; Susumu Nakagawa, both of Tokyo; Soichiro Toda, Koshigaya, all of Japan

[73] Assignee: Bristol-Myers Company, New York, N.Y.

[22] Filed: June 4, 1973

[21] Appl. No.: 366,925

Related U.S. Application Data

[63] Continuation-in-part of Ser. No. 266,164, June 26, 1972, abandoned.

[52] U.S. Cl. ...... 260/210 AB; 260/210 R; 424/180; 424/181
[51] Int. Cl. .......................................... C07c 129/18
[58] Field of Search ................... 260/210 AB, 210 R

[56] References Cited

UNITED STATES PATENTS 3,781,268  12/1973  Kawaguchi et al. .......... 260/210 AB

OTHER PUBLICATIONS

Omoto et al., "The Journal of Antibiotics" Vol. XXIV, No. 7, 1971.

*Primary Examiner*—Johnnie R. Brown
*Attorney, Agent, or Firm*—Robert E. Havranek

[57] ABSTRACT

Derivatives of lividomycin A have been prepared which possess substantially improved anti-bacterial activity. An example of such an agent is 1-[L-(-)-γ-amino-α-hydroxybutyryl]lividomycin A [IVa, BB-K53].

7 Claims, No Drawings

ANTIBIOTIC DERIVATIVES

CROSS-REFERENCE TO RELATED APPLICATION

This application is a continuation-in-part of copending application Ser. No. 266,164 filed June 26, 1972, and now abandoned.

BACKGROUND OF THE INVENTION

1. Field of the Invention

This invention relates to semisynthetic 1-substituted derivatives of lividomycin A, said compounds being prepared by acylating the 1-amino-function of lividomycin A with γ-amino-α-hydroxybutyryl, β-amino-α-hydroxypropionyl or δ-amino-α-hydroxyvaleryl moieties.

2. Description of the Prior Art

The lividomycins are reported and described in the Journal of Antibiotics (Japan) 24, No. 6, pp. 333–346 (1971). In particular, lividomycin A and B are reported as fermented from *Streptomyces lividus* nov. sp., a culture deposited in the American Type Culture Collection at Rockville, Md. at A.T.C.C. No. 21178 and in the Fermentation Research Institute, Agency of Industrial Science & Technology, Chiba, Japan as FERM-P No. 50.

SUMMARY OF THE INVENTION

The compound having the formula

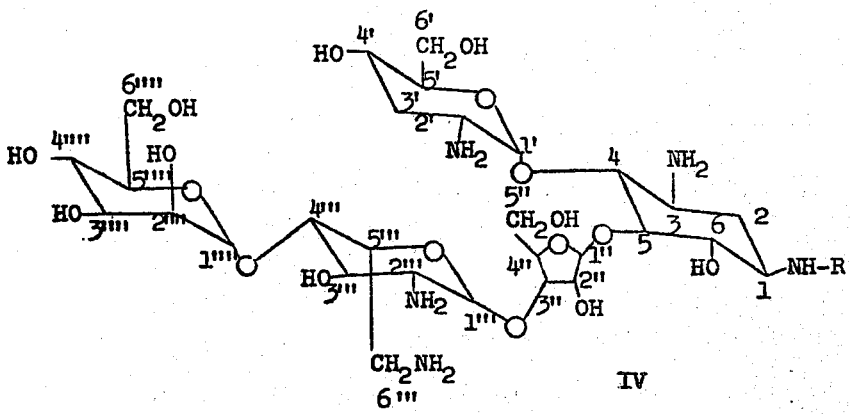

in which R is L-(—)-γ-amino-α-hydroxybutyryl, L-(—)-β-amino-α-hydroxypropionyl or L-(—)-δ-amino-α-hydroxyvaleryl; or a nontoxic pharmaceutically acceptable acid addition salt thereof is a valuable antibacterial agent.

This invention relates to a semi-synthetic derivative of lividomycin A, said compounds being known as 1-[L-(—)-γ-amino-α-hydroxybutyryl] lividomycin A (IVa), 1-[L-(—)-β-amino-α-hydroxypropionyl] lividomycin A (IVb) or 1-[L-(—)-δ-amino-α-hydroxyvaleryl] lividomycin A (IVc) and having the formula

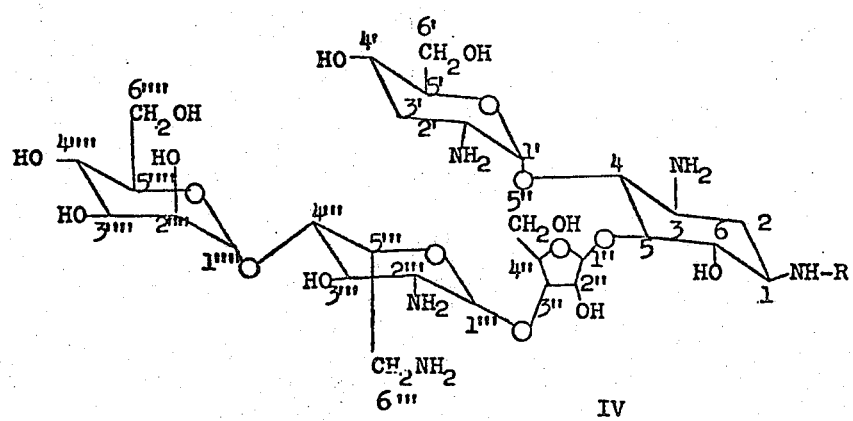

in which R is L-(—)-γ-amino-α-hydroxybutyryl, L-(—)-β-amino-α-hydroxypropionyl or L-(—)-δ-amino-α-hydroxyvaleryl; or a nontoxic pharmaceutically acceptable acid addition salt thereof.

For the purpose of this disclosure, the term "nontoxic pharmaceutically acceptable acid addition salt" shall mean a mono, di-, tri, tetra or pentasalt formed by the interaction of one molecule of compound IV with 1–5 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

Lividomycin A is a compound having the formula

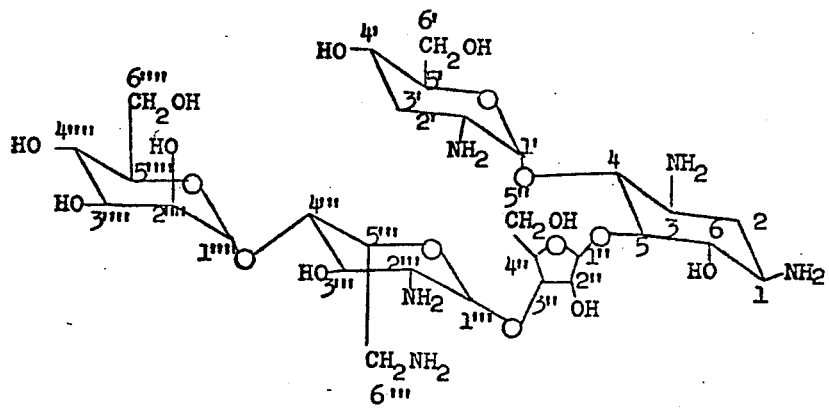

The compounds of the present invention are prepared by the following diagramatic scheme:

1.) Lividomycin A $\xrightarrow{\text{N-(Benzyloxycarbonyloxy)}}{\text{Succinimide}}$

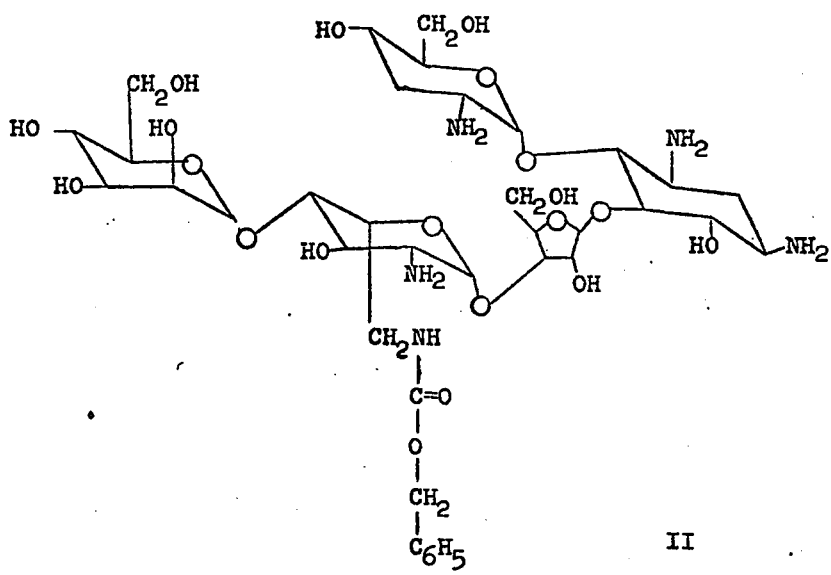

II

2.) Compound II $\xrightarrow{\substack{\text{N-Hydroxysuccinimide ester of} \\ \text{L-(−)-γ-benzyloxycarbonylamino-} \\ \text{α-hydroxybutyric acid}}}$

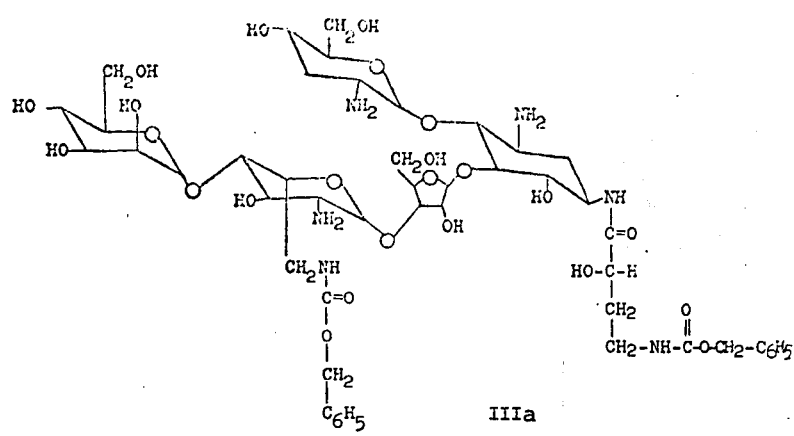

IIIa

Continued
3.) Compound IIIa  $\xrightarrow{H_2/Pd/C}$

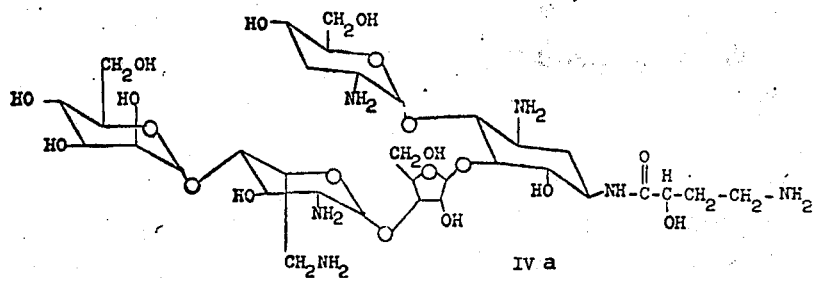

A preferred embodiment of the present invention is the compound having the formula

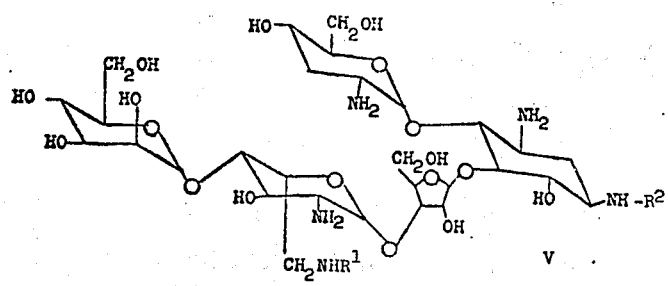

in which $R^1$ is H or

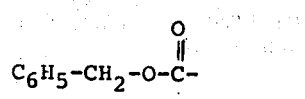

and $R^2$ is H, L-(−)-γ-amino-α-hydroxybutyryl, L-(−)-β-amino-α-hydroxypropionyl or L-(−)-δ-amino-α-hydroxyvaleryl; wherein $R^1$ or $R^2$ must be other than H; or a nontoxic pharmaceutically acceptable acid addition salt thereof.

Another preferred embodiment is the compound of formula V in which $R^1$ is

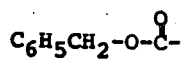

and $R^2$ is H.

A most preferred embodiment is the compound of formula V wherein $R^1$ is H and $R^2$ is L-(−)-β-amino-α-hydroxypropionyl; or a non-toxic pharmaceutically acceptable acid addition salt thereof.

A most preferred embodiment is the compound of formula V wherein $R^1$ is H and $R^2$ is L-(−)-γ-amino-α-hydroxybutyryl; or a non-toxic pharmaceutically acceptable acid addition salt thereof.

A most preferred embodiment is the compound of formula V wherein $R^1$ is H and $R^2$ is L-(−)-δ amino-α-hydroxyvaleryl; or a nontoxic pharmaceutically acceptable acid addition salt thereof.

Other most preferred embodiments are the sulfate, hydrochloride, acetate, maleate, citrate, ascorbate, nitrate or phosphate salts of compound V.

Another most preferred embodiment is the monosulfate salt of compound IV.

The objectives of the present invention have been achieved, by the provision according to the present invention of the process for the preparation of the compound having the formula

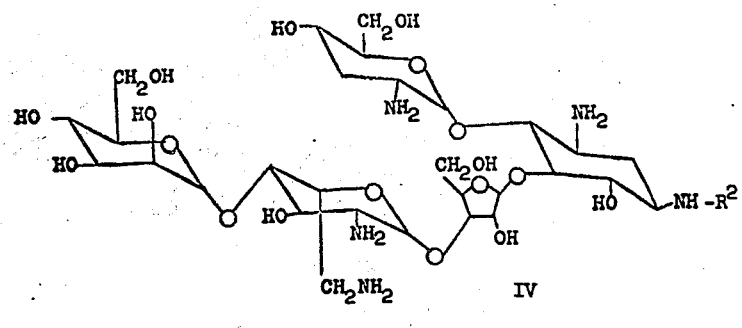

in which $R^2$ is L-(−)-γ-amino-α-hydroxybutyryl; L-(−)-β-amino-α-hydroxypropionyl or L-(−)-δ-amino-α-hydroxyvaleryl; or a nontoxic pharmaceutically acceptable acid addition salt thereof; which process comprises the consecutive steps of A. treating lividomycin A with an agent selected from the compounds having the formula

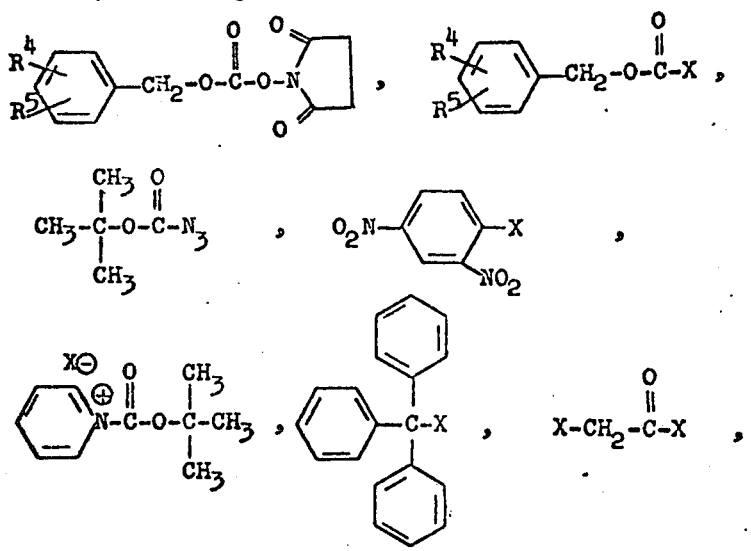

(or a carbodiimide addition compound thereof) or

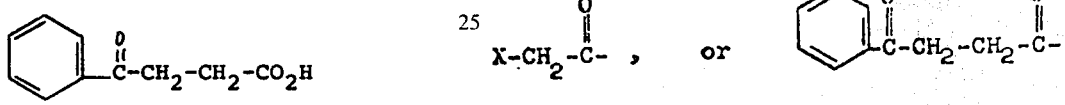

(or a carbodiimide addition compound thereof), in which $R^4$ and $R^5$ are alike or different and each is H, F. Cl, Br, $NO_2$, OH, (lower)alkyl or (lower)alkoxy, X is chloro, bromo or iodo, or a functional equivalent as a reactant; in a ratio of one mole or less of agent per mole of lividomycin A in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkylpiperidine, or mixtures thereof, but preferably 1:1 water-tetrahydrofuran, at a temperature below 50° C and preferably below 25° C, to produce the compound having the formula and X, $R^4$ and $R^5$ are as defined above;

B. acylating compound II with an acylating agent having the formula

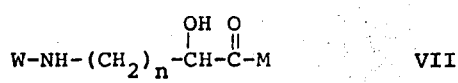

in which $n$ is an integer of 1 to 3 inclusive and W is a radical selected from the group consisting

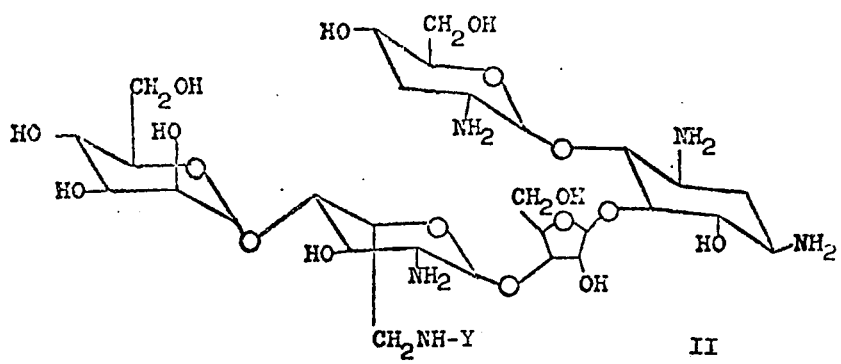

in which Y is a radical of the formula

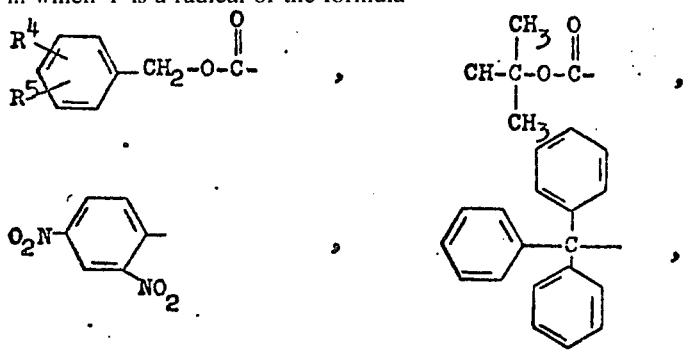

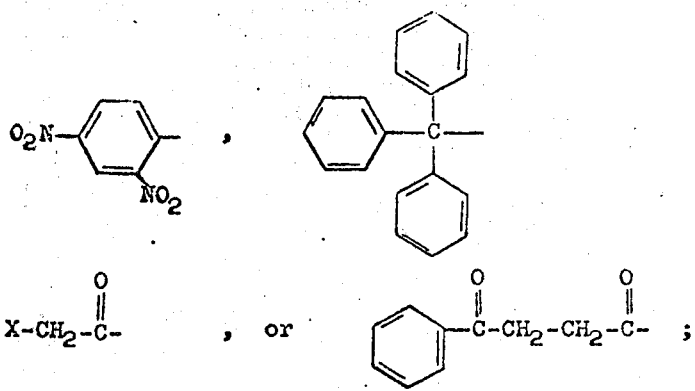

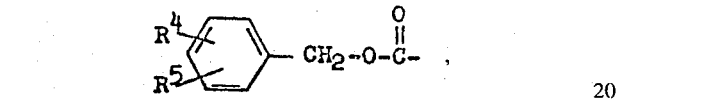

but preferably

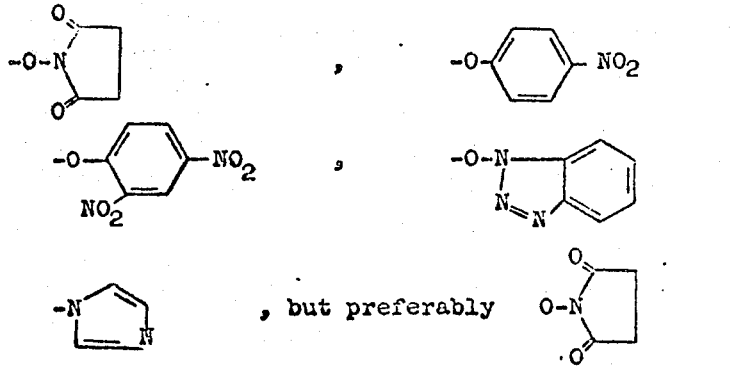

M is a radical selected from the group comprising preferably when W and Y are radicals of the formula in which $R^4$ and $R^5$ are as above; in a ratio of at least 0.5 mole of compound VII per mole of compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water-tetrahydrofuran, to produce the compound of the formula by hydrogenating compound III with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethylene-glycol dimethyl ether, propyleneglycol dimethyl ether, or the like, but preferably 1:1 water-dioxane.

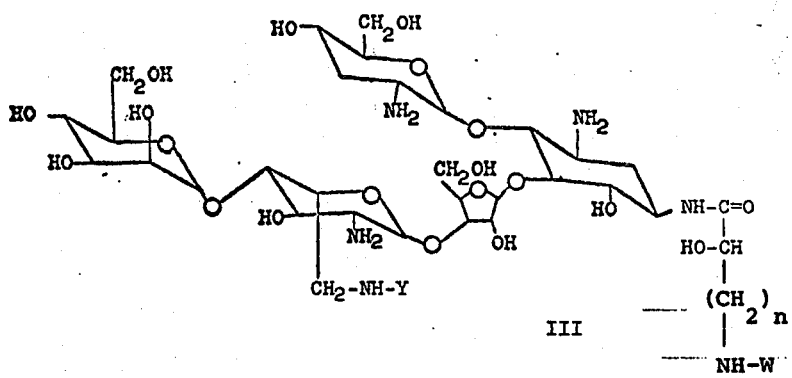

in which Y, n and W are as above; and

C. removing the blocking groups W and Y from compound III by methods commonly known in the art, and It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences 59, pp. 1-27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2-4-dinitrophenol, thiophenol, thioacetic acid) must be used or the free acid itself may be coupled with compound II after first reacting said free acid with N,N'-dimethylchloroforminium chloride [cf. Great Britain 1,008,170 and Novak and Weichet, Experientia XXI/6, 360 (1964)] or by the use of enzymes or of an N,N' -carbonyldiimidazole or an N,N'-carbonylditriazole [cf. Sheehan and Hess, J. Amer. Chem. Soc. 77, 1967, (1955)] or of alkynylamine reagent [cf. R. Buijile and H. G. Viehe, Angew, Chem., International Edition 3,582 (1964)], or of a ketenimine reagent [cf. C. L. Stevens and M. E. Monk, J. Amer. Chem. Soc., 80,4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid which amide nitrogen is a member of a quasiaromatic five membered ring containing at least two nitrogen atoms, i.e., imidazole, pyrazole, the triazoles, benzimidazole, benzotrizole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. These reactions are well known in the art [cf. U.S. Pat. Nos. 3,079,314, 3,117,126 and 3,129,224 and British Patent Nos. 932,644, 957,570 and 959,054].

Compound IVa, 1-[L-(−)-γ-amino-α-hydroxybutyryl]lividomycin A, possesses excellent antibacterial activity. Illustrated below is a table showing the minimal inhibitory concentrations (MIC's) of lividomycin A and compound IVa (BB-K53) against a variety of gram-positive and gram-negative bacteria as obtained by the Steers agar-dilution method (Table I). Nutrient Agar Medium was used in the study of Table I.

| In Vitro Antimicrobial Activities of BB-K53 (IVa) | | | |
|---|---|---|---|
| Strain | Bristol No. | IVa BB-K53 | MIC by Steer's Method (nutrient agar medium), mcg./ml. Lividomycin A |
| E. coli NIHJ | | 1.6 | 1.6 |
| do. Juhl | A15119 | 3.1 | 3.1 |
| do. | A15169 | 3.1 | 3.1 |
| do. KM-R* | A20363 | 3.1 | >100 |
| E. coli | A9844 | 1.6 | 1.6 |
| do. KM-R* | A20365 | 0.8 | 100 |
| do. K-12 | A9632 | 1.6 | 3.1 |
| do. do. KM-R* | A20664 | 1.6 | 1.6 |
| do. do. KM-R* | A20665 | 1.6 | 100 |
| E. coli W677 | A20684 | 1.6 | 3.1 |
| do. JR/W677 | A20683 | 3.1 | 3.1 |
| K. pneumoniae D-11 | | 0.8 | 0.8 |
| do. Type 22 No. 3038 | A20680 | 3.1 | 3.1 |
| S. marcescens | A20019 | 1.6 | 1.6 |
| P. aeruginosa D-15 | | 12.5 | 12.5 |
| do. H9 D113 KM-R* | | 25 | 12.5 |
| do. | A9923 | 25 | 25 |
| do. | A9930 | 0.8 | 1.6 |
| do. | A15150 | 50 | 50 |
| P. aeruginosa | A15194 | 50 | 50 |
| do. GM-R** | A20717 | 50 | 50 |
| do. GM-R** | A20718 | 50 | 100 |
| P. vulgaris | A9436 | 1.6 | 1.6 |
| do. | A9526 | 1.6 | 1.6 |
| P. mirabilis | A9554 | 3.1 | 3.1 |
| do. | A9900 | 1.6 | 3.1 |
| P. morganii | A9553 | 1.6 | 1.6 |
| do. | A20031 | 3.1 | 1.6 |
| S. aureus Smith | | 0.4 | 0.8 |
| do. 209P SM-R*** | | 3.1 | 3.1 |
| S. aureus 209P KM-R* | A20239 | 1.6 | 100 |
| Mycobacterium 607 | | 0.2 | 0.4 |
| do. do. KM-R* | | 6.3 | 12.5 |
| do. do. KM*, SM-R*** | | 3.1 | 6.3 |
| do. phlei | | 0.1 | 0.4 |
| do. ranae | | 0.2 | 0.4 |

KM*-Kanamycin Resistant.
GM**-Gentamicin Resistant.
SM***-Streptomycin Resistant.

Compound IVa, BB-K53, showed much better activity than lividomycin A against four of kanamycin-resistant organisms (*E. coli* A20363, *E. coli* A20365, *E. coli* A20665 and *S. aureus* A20239) which inactivate kanamycin (and probably also lividomycin A), by phosphorylation. BB-K53 has almost the same activity as lividomycin A against other Gram-positive and Gram-negative organisms tested so far including two gentamicin-resistant strains, *E. coli* A20683 and *K. pneumoniae* A20680 which inactivate gentamicin by adenylation.

Compounds IVb (BB-K121) and IVc (BB-K103) were also assayed in vitro as compared to compound IVa and lividomycin A as shown below:

MIC (mcg./ml.)

| Strain | | | Bristol No. | IVb | IVc | IVa | Lividomycin A |
|---|---|---|---|---|---|---|---|
| E. coli | NIHJ | | | 6.3 | 6.3 | 3.1 | 3.1 |
| do. | Juhl | | A15119 | 12.5 | 12.5 | 6.3 | 6.3 |
| do. | | | A15169 | 6.3 | 12.5 | 3.1 | 3.1 |
| do. | KM-R | | A20363 | 12.5 | 25 | 6.3 | >100 |
| do. | | | A9844 | 6.3 | 6.3 | 1.6 | 1.6 |
| do. | KM-R | | A20365 | 3.1 | 3.1 | 3.1 | 100 |
| do. | K-12 | | | 6.3 | 6.3 | 3.1 | 3.1 |
| do. | do. KM-R | | A20664 | 3.1 | 6.3 | 3.1 | 3.1 |
| do. | do. KM-R | | A20665 | 6.3 | 6.3 | 1.6 | 100 |
| do. | W677 | | A20684 | 3.1 | 6.3 | 3.1 | 3.1 |
| do. | JR/W677 | | A20683 | 6.3 | 12.5 | 3.1 | 3.1 |
| K. pneumoniae D-11 | | | | 0.8 | 0.8 | 0.8 | 0.8 |
| do. Type 22 No. 3038 | | | A20680 | 6.3 | 12.5 | 3.1 | 3.1 |
| S. marcescens | | | A20019 | 6.3 | 3.1 | 3.1 | 6.3 |
| P. aeruginosa | D-15 | | | 25 | 50 | 12.5 | 12.5 |
| do. | H9 | D-113 KM-R | | 50 | 100 | 25 | 25 |
| do. | | | A9923 | 50 | >100 | 25 | 25 |
| do. | | | A9930 | 3.1 | 6.3 | 0.8 | 1.6 |
| do. | | | A15150 | 100 | >100 | 50 | 25 |
| do. | | | A15194 | 50 | 100 | 25 | 25 |
| do. | GM-R | | A20717 | 100 | >100 | 50 | 25 |
| do. | GM-R | | A20718 | 50 | >100 | 25 | 50 |
| P. vulgaris | | | A9436 | 1.6 | 3.1 | 0.8 | 1.6 |
| do. | | | A9526 | 3.1 | 6.3 | 1.6 | 1.6 |
| P. mirabilis | | | A9554 | 6.3 | 12.5 | 3.1 | 3.1 |
| do. | | | A9900 | 3.1 | 6.3 | 3.1 | 3.1 |
| P. morganii | | | A9553 | 3.1 | 3.1 | 1.6 | 1.6 |
| do. | | | A20031 | 6.3 | 12.5 | 6.3 | 3.1 |
| S. aureus Smith | | | | 0.4 | 1.6 | 0.4 | 0.4 |
| do. | 209P | SM-R | | 6.3 | 25 | 3.1 | 3.1 |
| do. | | KM-R | A20239 | 6.3 | 25 | 3.1 | >100 |
| Mycobacterium | 607 | | | 0.8 | 0.4 | 0.4 | 0.8 |
| do. | do. KM-R | | | 6.3 | 25 | 12.5 | 12.5 |
| do. | do. KM,SM-R | | | 6.3 | 12.5 | 6.3 | 6.3 |
| do. | phlei | | | 0.4 | 0.4 | 0.2 | 0.4 |
| do. | ranae | | | 0.8 | 0.4 | 0.4 | 0.8 |

Compound IVa generally appears more potent against the test organisms than either IVb or IVc but are still potent antimicrobial agents.

Compounds IV are valuable as anti-bacterial agents, nutritional supplements in animal feeds, therapeutic agents in poultry and animals, including man, and are especially valuable in the treatment of infectious diseases caused by Gram-positive and Gram-negative bacteria.

Compounds IV when administered orally are useful as an adjunctive treatment for preoperative sterilization of the bowel. Both aerobic and anaerobic flora which are susceptible to these drugs are reduced in the large intestine. When accompanied by adequate mechanical cleansing, they are useful in preparing for colonic surgery.

Compounds IV are effective in the treatment of systemic bacterial infections when administered parenterally in the dosage range of about 250 mg. to about 3000 mg. per day in divided doses three or four times a day. Generally the compounds are effective when administered at a dosage of about 5.0 to 7.5 mg./kg. of body weight every 12 hours.

Compounds of formula IV and the salts thereof are known to form mono- and polyhydrates upon isolation from aqueous solvents. Accordingly, the hydrates so produced are considered an integral part of the instant invention.

EXAMPLES

Example 1

Preparation of
L-(−)-γ-Benzyloxycarbonylamino-α-hydroxybutyric acid (VIa).

L-(−)-γ-amino-α-hydroxybutyric acid (7.4 g., 0.062 mole) was added to a solution of 5.2 g. (0.13 mole) of sodium hydroxide in 50 ml. of water. To the stirred solution was added dropwise at 0°–5°C. over a period of 0.5 hour, 11.7 g. (0.068 mole) of carbobenzoxy chloride and the mixture was stirred for 1 hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5°–79.5° C., $[\alpha]_D$ −4.5° (c=2, CH$_3$OH). Infrared (IR) [KBr]: γc=o 1740, 1690 cm$^{-1}$. Nuclear Magnetic Resonance (NMR) (acetone-d) δ (in ppm from TMS) 2.0 (2H, m), 3.29 (2H, d-d, J=6.7 and 12 Hz), 4.16 (1H, d-d, J=4.5 and 8 Hz), 4.99 (2H, s), 6.2 (2H, broad), 7.21 (5H,s).

Anal. calc'd. for C$_{12}$H$_{15}$NO$_5$: C, 56.91; H, 5.97; N, 5.53.

Found: C, 56.66; H, 5.97; N, 5.47.

Example 2

N-Hydroxysuccinimide Ester of L-(−)-γ-benzyloxycarbonylamino-α-hydroxybutyric Acid (VIIa).

A solution of 10.6 g. (0.042 mole) of VI and 4.8 g. (0.42 mole) of N-hydroxysuccinimide[1] in 200 ml. of ethyl acetate was cooled to 0° C. and then 8.6 g. (0.042 mole) of N,N'-dicyclohexylcarbodiimide was added. The mixture was kept overnight in a refrigerator. The dicyclohexylurea which separated was filtered off and the filtrate was concentrated to about 50 ml. under reduced pressure to give colorless crystals of VIIa which were collected by filtration; 6.4 g./m.p. 121°–122.5° C. The filtrate was evaporated to dryness in vacuo and the crystalline residue was washed with 20 ml. of a benzene-n-hexane mixture to give an additional amount of VIIa. The total yield was 1.34 g. (92%), $[\alpha]_D$ 1.5° (c=2, CHCl$_3$) IR(KBr) γc=o 1810, 1755, 1740, 1680 cm$^{-1}$. NMR (acetone-d$_6$) δ (in ppm from TMS) 2.0 (2H, m), 2.83 ( 4H, s), 3.37 (2H, d-d, J=6.5 and 12.5 Hz), 4.56 (1H, m), 4.99 (2H, s), 6.3 (2H, broad), 7.23 (5H, s).

Anal. calc'd for $C_{16}H_{18}N_2O_7$: C, 54.85; H, 5.18; N, 8.00.

Found: C, 54.79, 54.70; H, 5.21, 5.20; N, 8.14, 8.12.

[1]. G. W. Anderson et al., J. Am. Chem. Soc., 86, 1839 (1964).

Example 3

Preparation of 6'''-N-Benzyloxycarbonyllividomycin A (II).

To a stirred solution of 2.5 g. (3.28 m mole) of lividomycin A free base in 50 ml. of 50% THF (tetrahydrofuran) and water was added 817 mg. (3.28 m. mole) of N-benzyloxycarbonyloxy succinimide at 10° C. The reaction mixture was stirred overnight at room temperature and evaporated under reduced pressure to remove the organic solvent. The resultant aqueous solution being filtered to remove insoluble material, the filtrate was charged on a column of CG-50 (NH$_4^+$, 60 ml.) [Amberlite]. The column was washed with 200 ml. of H$_2$O and eluted with 0.1 N NH$_4$OH. The eluate was collected in 15-ml. fraction. Fractions 19 to 29 were combined, evaporated under reduced pressure and lyophilized to give 1.39 g. (47%) of crude 6'''-N-benzyloxycarbonyllividomycin A, which did not contain lividomycin A itself. γc=o 1700 cm$^{-1}$. The product was used for the next reaction without further purification.

Example 4

Preparation of 1-[L-(−)-γ-benzyloxycarbonylamino-α-hydroxybutyryl]-6'''-N-carbobenzoxylividomycin A (IIIa).

To a stirred solution of 1.35 g. (1.5 m. mole) 6'''-N-benzyloxycarbonyllividomycin A in 30 ml. of 50% THF and water was added 525 mg. (1.5 m. mole) of N-hydroxysuccinimido ester of L-(−)-γ-benzyloxycarbonylamino-α-hydroxybutyric acid at 10° C. The reaction mixture was stirred for 5 hours at room temperature to yield a mixture of N-acylated 6'''-N-benzyloxycarbonyllividomycin A, of which 1-[L-(−)γ-benzyloxycarbonylamino-α-hydroxybutyryl]-6'''-carbobenzoxylividomycin A (III) was a major component.

Example 5

Preparation of 1-[(L-(−)-γ-amino-α-hydroxybutyryl]-lividomycin A (IVa, BB-K53).

The crude product IIIa from example 4 was hydrogenated under atmospheric pressure in the presence of 200 mg. of 10% palladium on charcoal overnight at room temperature. The reaction mixture was filtered and evaporated under reduced pressure to remove the organic solvent. The resultant aqueous solution was adsorbed on a column of CG-50 (NH$_4^+$, 30 ml.). The column was washed with 100 ml. H$_2$O and irrigated successively with 400 ml. of 0.1 N ammonia, 300 ml. of 0.2 N ammonia, 400 ml. of 0.3 N ammonia, 300 ml. of 0.5 N ammonia and finally 600 ml. of 1 N ammonia. The eluate was collected in 7-ml. fraction. The fractions were divided into the following cuts by ninhydrin test, bioassay (*B. subtilis*) and TLC (thin layer chromatography) [silica gel, CHCl$_3$—CH$_3$OH—28%NH$_4$OH—H$_2$O=1:4:2:1, ninhydrin]. The fractions belonging to the same cut were combined, concentrated under reduced pressure and lyophilized.

| Cut | Fraction No. | Eluted by | Wt. isolated | Compound |
| --- | --- | --- | --- | --- |
| 1 | 50–68 | 0.1N– NH$_4$OH 0.2N | 428 mg. | Lividomycin A |
| 2 | 92–96 | 0.3N NH$_4$OH | 124 | BB-K52 |
| 3 | 100–108 | 0.3N NH$_4$OH | 143[1] | BB-K53 |
| 4 | 119–131 | 0.3N NH$_4$OH | 77[2] | BB-K54 |
| 5 | 157–164 | 0.5N NH$_4$OH | 45 | BB-K55 |
| 6 | 197–203 | 1.0N NH$_4$OH | 39 | BB-K56 |
| 7 | 208–212 | 1.0N NH$_4$OH | 11 | BB-K57 |
| 8 | 214–220 | 1.0N NH$_4$OH | 47 | BB-K58 |

[1] Rechromatography with CG-50 (NH$_4^+$, 10 ml.) gave 126 mg. of a pure product designated BB-K53, lot 1–2.

[2] Rechromatography with CG-50 (NH$_4^+$, 5 ml.) gave 30 mg. of pure BB-K54.

Properties

| Compound | M.p. (dec.) | RF[3] | γC=O (KBr) | $[\alpha]D$ (H$_2$O) |
| --- | --- | --- | --- | --- |
| BB-K52 | 192–195°C. | 0.25 | 1640 cm$^{-1}$ | +50.5° |
| BB-K53 (lot 1–2) | 194–197 | 0.18 | 1640 | +68.5 |
| BB-K54 | 186–192 | 0.23 | 1640 | |
| BB-K55 | 189–194 | 0.11[4] | | |
| BB-K56 | 178–184 | 0.11[4] | 1640 | |
| BB-K57 | 190–197 | 0.07[5] | 1650 | |
| BB-K58 | 188–192 | 0.07[5] | 1650 | |

[3] TLC: silica gel plate, CHCl$_3$-MeOH-28%NH$_4$OH-H$_2$O(1:4:2:1).

[4] BB-K55 and 56 were differentiated by multi-developed TLC.

[5] BB-K57 is active against some lividomycin-resistant organisms, while BB-K58 is not.

Microanalysis of BB-K53

Anal. calc'd. for $C_{33}H_{62}N_6O_{20}\cdot2H_2CO_3$: C, 42.59; H, 6.74; N. 8.52.

Found: C, 42.57; H, 7.05; N, 8.68

It has been confirmed by TLC that all of the products BB-K52 through BB-K58, regenerated lividomycin A and α-hydroxy-γ-aminobutyric acid (HABA) by heating for one hour in 0.5 N sodium hydroxide solution. This fact as well as the presence of an amido carbonyl band in the infrared spectra show that all of them are lividomycin A derivatives acylated with α-hydroxy-γ-aminobutyric acid.

Compound IVa, BB-K53, the most active antibiotic component, is the acylated derivative of lividomycin A in which the HABA residue is linked to the 1-amino-group of the deoxystreptamine moiety. It showed increased activity over lividomycin A against organisms which inactivate aminoglucoside antibiotics by phosphorylation. This has been supported by detection of deoxystreptamine in a preliminary experiment in which BB-K53 was subjected to oxidation with an excess of periodate (5 moles uptake after 17 hours at room temperature) followed by acid hydrolysis (6 N HCl at 100° for one hour). TLC of the hydrolysate gave a ninhydrin-positive spot due to deoxystreptamine along with a few unidentified ninhydrin-positive spots.

Example 6

Preparation of N-(Benzyloxycarbonyloxy)succinimide.

N-Hydroxysuccinimide (23 g., 0.2 mole) was dissolved in a solution of 9 g. (0.22 mole) of sodium hydroxide in 200 ml. of water. To the stirred solution was added dropwise 34 g. (0.2 mole) of carbobenzoxychloride with water-cooling and then the mixture was stirred at room temperature overnight to separate the carbobenzoxy derivative which was collected by filtration, washed with water and air dried. Yield 41.1 g. (82%). Recrystallization from benzene-n-hexane (10:1) gave colorless prisms melting at 78°–79° C.

Example 7

Preparation of L-(−)-γ-amino-α-hydroxybutyric acid from ambutyrosin A or B or mixtures thereof.

Ambutyrosin A (5.0 gm.) [U.S. Pat. No. 3,541,078, issued Nov. 17, 1970] was refluxed with 160 ml. of 0.5 N sodium hydroxide for one hour. The hydrolysate was neutralized with 6N HCl and chromatographed on a column of CG-50 ($NH_4^+$ type). The desired L-(−)-γ-amino-αhydroxybutyric acid was isolated by developing the column with water and removing the water by freeze drying. The L-(−)-γ-amino-α-hydroxybutryic acid is characterized as a crystalline material having a m.p. of 212.5°–214.5° C. [Column 2, lines 31–38, U.S. Pat. No. 3,541,078].

Example 8

Preparation of L-(−)-γ-amino-α-hydroxybutyric Acid from DL-α-hydroxy-γ-phthalimidobutyric Acid.

A. Dehydroabietylammonium L-α-hydroxy-γ-phthalimidobutyrote: To a solution of 25 g. (0.1 mole) of α-hydroxy-γ-phthalimidobutyric acid[1] in 200 ml. of ethanol was added a solution of 29 g. (0.1 mole) of dehydroabietylamine in 130 ml. of ethanol. The solution was shaken vigorously for a minute and stood at room temperature for 5 hours during which time fine needles crystallized out. The crystals were collected by filtration, washed with 50 ml. of ethanol and air-dired to obtain 30.1 g. (56%) of a diastereomer of the dehydroabiethylamine salt. M.p. 93°–94° C. $[\alpha]_D^{24}$ +15° (C. 2.5, MeOH). Recrystallization from 300 ml. of ethanol gave 23.2 g. (43%) of the pure product. M.p. 94°–95° C. $[\alpha]^{24}$ +10.8° (C. 2.5 MeOH). Further recrystallization did not change the melting point and the specific rotation.

Anal. calc'd for $C_{32}H_{42}N_2O_5 \cdot H_2O$: C, 69.54; H, 8.02; N, 5.07.

Found: C, 69.58; H, 8.08; N, 5.07.

1. Y. Saito et al., Tetrahedron Letters, 1970, 4863.

B. L-(−)-γ-amino-α-hydroxybutric Acid: To a solution of 1.5 g. (0.014 mole) of sodium carbonate in 40 ml. of water were added 5.3 g. (0.01 mole) of dehydroabietylammonium L-α-hydroxy-γ-phthalimidobutyrate and 60 ml. of ether. The mixture was shaken vigorously until all of the solid had dissolved. The ether layer was separated. The aqueous solution was washed twice with 20-ml. portions of ether and evaporated to 15 ml. under reduced pressure. To the concentrate was added 10 ml. of concentrated hydrochloric acid and the mixture was refluxed for 10 hours. After cooling, separated phthalic acid was removed by filtration. The filtrate was evaporated under reduced pressure. The residue was dissolved in 10 ml. of water and the solution was evaporated to dryness. This operation was repeated twice to remove excess hydrochloric acid. The residual syrup was dissolved in 10 ml. of water and filtered to remove a small amount of insoluble phthalic acid. The filtrate was adsorbed on a column of IR-120 ($H^+$, 1 cm. × 35 cm.), the column was washed with 300 ml. of water and eluted with 1 N ammonium hydroxide solution. The eluate was collected in 15-ml fraction. The ninhydrin positive fractions 10 to 16 were combined and evaporated under reduced pressure to give a syrup which crystallized gradually. The crystals were triturated with ethanol, filtered and dried in a vacuum desiccator to give 0.78 g. (66%) of L-(−)-γ-amino-α-hydroxybutyric acid. M.p. 206°–207° C. $[\alpha]_D^{24}$ −29° (C. 2.5, $H_2O$). The IR spectrum was identical with an authentic sample which was obtained from ambutyrosin.

Example 9

Preparation of Monosulfate Salt of 1-[L-(−)-γ-amino-α-hydroxybutyryl]lividomycin A.

One mole of 1-[L-(−)-γ-amino-α-hydroxybutyryl]-lividomycin A is dissolved in 1 to 3 liters of water. The solution is filtered to remove any undissolved solids. To the chilled and stirred solution is added 1 mole of sulfuric acid dissolved in 500 ml. of water. The mixture is allowed to stir for 30 minutes, following which cold ethanol is added to the mixture until precipitation occurs. The solids are collected by filtration and are determined to be the desired monosulfate salt.

Example 10

Preparation of the Disulfate Salt of 1-[L-(−)-γ-amino-α-hydroxybutyryl]lividomycin A.

One mole of 1-[L-(−)-γ-amino-α-hydroxybutyryl]-lividomycin A is dissolved in 1 to 3 liters of water. The solution is filtered to remove any undissolved solids. To the chilled and stirred solution is added 2 moles of sulfuric acid dissolved in 100 ml. of water. The mixture is allowed to stir for 30 minutes, following which cold ethanol is added to the mixture until precipitation occurs. The solids are collected by filtration and are determined to be the desired disulfate salt.

Example 11

Preparation of L-β-Benzyloxycarbonylamino-α-hydroxypropionic Acid (VIb).

L-β-Amino-α-hydroxypropionic acid* (8.2 g., 0.078 mole) was dissolved in a solution of 6.56 g. (0.0164 mole) of sodium hydroxide and in 60 ml. of water. To the stirred solution was added dropwise 14.7 g. (0.086)

mole) of carbobenzoxy chloride below 5° C. The mixture was stirred for an hour at room temperature, washed with 60 ml. of ether and adjusted to pH 2 with dilute HCl. The precipitate was collected by filtration, washed with water and air-dried to give 9.65 g. (52%) of VIb. The filtrate was extracted with five 100-ml portions of ether. The ethereal solution was washed with water, dried over sodium sulfate and evaporated to dryness in vacuo to give additional 2.0 g. (11%) of VIb. A total of 11.65 g. of VIb was crystallized from 500 ml. of benzene-ethyl acetate (4:1) to give 9.36 g. (50%) of pure VIb m.p. 128.5°–129.5° C. Infrared (IR) (KBr): $\gamma c = o$ 1745, 1690 cm$^{-1}$. $[\alpha]_D^{25}$ +2.9° (c 5.0, MeOH). Nuclear Magnetic Resonance Spectra [NMR (DMSO-$d_6$)]: δ (in ppm) 3.05–3.45 (2H, m, CH$_2$N), 4.05 (1H, d-d, —O—CH—CO—), 5.03 (2H, s, CH$_2$Ar) 7.18 (1H, broad, NH), 7.36 (5H, s, ring H).

Anal. calc'd. for C$_{11}$H$_{13}$NO$_5$: C, 55.23; H, 5.48; N, 5.86.

Found: C, 55.34; H, 5.49; N, 5.87.

*K. Freudenberg, Ber., 47, 2027 91914).

Example 12

N-Hydroxysuccinimide Ester of L-β-benzylcarbonylamino-α-hydroxypropionic Acid (VIIb).

To a chilled and stirred solution of 478 mg. (2 m. moles) of VIb and 230 mg. (2 m. moles) of N-hydroxysuccinimide in 10 ml. of tetrahydrofuran (THF) was added 412 mg. (2 m. moles) of dicyclohexylcarbodiimide. The mixture was stirred for an hour at 0°–5° C., for 2 hours at room temperature and then filtered to remove the N,N'-dicyclohexylurea. The filtrate containing VIIb was used for the next reaction without isolation.

Example 13

Preparation of 1-[L-(−)-β-amino-α-hydroxypropionyl]lividomycin A (IVb, BB-K121).

To a stirred solution of 896 mg (1 m mole) of 6'''-N-benzyloxycarbonylividomycin A in 20 ml of 50% aqueous tetrahydrofuran (THF) was added a solution of 365 mg of crude N-hydroxysuccinimide ester of β-benzyloxycarbonylamino-α-hydroxypropionic acid (VIIb) in 5 ml of THF. The mixture was stirred for 5 hours and then hydrogenated overnight with 300 mg of 10% palladium charcoal at atmospheric pressure at room temperature. The hydrogenated mixture was filtered to remove the catalyst. The filtrate was evaporated in vacuo to remove most of the organic solvent. The resultant aqueous solution was passed through a column of amberlite CG-50 (NH$_4^+$, 30 ml), which was washed with 100 ml of water and eluted successively with 1.4 L of 0.1 N, 2.1 L of 0.2 N NH$_4$OH and finally 0.5 L of 0.3 N NH$_4$OH. The eluate was collected in 20-ml fractions and divided into the appropriate fraction based on Rf values of TLC (S-110, ninhydrin) and activity against *Bacillus subtilis*. Each fraction was evaporated in vacuo and freeze-dried.

| Fraction | Tube No. | NH$_4$OH (N) | Weight | Identity |
| --- | --- | --- | --- | --- |
| 1 | 26–30 | 0.1 | 130 mg | Lividomycin A |
| 2 | 31–50 | 0.1 | 335 mg | BB-K 121 |
| | | | | + lividomycin A |

Fraction 2 (335 mg) was rechromatographed on amberlite CG-50 (NH$_4^+$, 20 ml) to yield 16 mg of pure IVb; mp 200°–210° C, Rf 0.33, IR(KBr): $\gamma c = o$ 1650 cm$^{-1}$.

Anal. Calc'd for C$_{32}$H$_{60}$N$_6$O$_{20}$·3H$_2$CO$_3$·2H$_2$O: C, 39.25; H, 6.59; N, 7.87.

Found: C, 39.39; H, 6.61; N, 8.03.

Example 14

Preparation of L-δ-Benzyloxycarbonylamino-α-hydroxyvaleric acid (VIc).

To a stirred solution of 400 mg (3.0 m moles) of L-δ-amino-α-hydroxyvaleric acid* and 250 mg (6.5 m moles) of sodium hydroxide in 25 ml of water was added dropwise 580 mg (3.3 m moles) of carbobenzoxy chloride over a period of 30 minutes at 0°–5°C. The mixture was stirred for an for an hour at 5°–15°C, washed with 25 ml of ether, adjusted to pH 2 with hydrochloric acid and extracted with three 30-ml portions of ether. The combined ethereal solution was shaken with 10 ml of a saturated sodium chloride solution, dried over anhydrous sodium sulfate and evaporated in vacuo to give crystals which were recrystallized from benzene to yield 631 mg (78%) of VIc, mp 110°–111°C.; infrared spectrum [IR(KBr)]: 3460, 3350, 1725, 1685, 1535, 1280, 730, 690 cm$^{-1}$. Nuclear magnetic resonance spectrum [NMR(acetone-$d_6$)] δ (in ppm) 1.70 (4H, m) 4.14 (2H, q, J=4.5Hz), 4.19 (1H, m), 4.82 (2H, s), 6.2 (3H, broad), 7.25 (5H, s). $[\alpha]_D^{25}$ + 1.6 (c 10, MeOH), Anal. Calcd. for C$_{13}$H$_{17}$NO$_5$: C, 58.42; H, 6.41; N, 5.24.

Found: C, 58.36; H, 6.50; N, 5.27.

*S. Ohshiro et al., Yakagaku Zasshi, 87, 1184 (1967).

Example 15

N-Hydroxysuccinimide ester of L-δ-benzyloxycarbonylamino-α-hydroxyvaleric acid (VIIc).

To a stirred and chilled solution of 535 mg (2.0 m moles) of VIc and 230 mg (2.0 m moles) of N-hydroxysuccinimide in 55 ml of ethyl acetate was added 412 mg (2.0 m moles) of N, N'-dicyclohexylcarbodiimide (DCC). The mixture was stirred for 3 hours at room temperature and filtered to remove precipitated N, N'-dicyclohexylurea. The filter was evaporated in vacuo to yield 780 mg (100%) of viscous syrup (VIIc). IR(Neat): $\gamma c = o$ 1810, 1785, 1725 cm$^{-1}$.

Example 16

Preparation of 1-[L-(−)-δ-amino-α-hydroxyvaleryl]lividomycin A (IVc, BB-K 103).

To a stirred solution of 896 mg (1 m mole) of II in 20 ml of 50% aqueous THF was added 420 mg of N-hydroxysuccinimide ester of δ-benzyloxycarbonylamino-α-hydroxyvaleric acid VIIc in 5 ml of THF at 10°C. The reaction mixture was stirred for 5 hours at room temperature and hydrogenated overnight with 150 mg of 10% palladium on charcoal at room temperature under ordinary pressure. The catalyst was removed by filtration. The filtrate was evaporated in vacuo to remove most of the organic solvent. The resultant aqueous solution was adsorbed on a column of amberlite CG-50 ($NH_4^+$, 30 ml), which was washed with 100 ml of water, then eluted successively with 2 L of 0.1 N, 1 L of 0.2N, 1 L of 0.3 N, 1 L of 0.5 N and finally 1 L of 1.0 N $NH_4OH$. The eluate was collected in 20-ml fractions, monitored by TLC (S-110, ninhydrin) and disk assay (Bacillus subtilis) and divided into the following appropriate fractions. Each fraction was evaporated in vacuo and lyophilized.

| Fraction | Tube No. | NH OH | Weight | Identity |
| --- | --- | --- | --- | --- |
| 1 | 47–101 | 0.1 N | 302 mg | lividomycin A |
| 2 | 126–145 | 0.2 N | 112 mg | BB-K 102 position isomer |
| 3 | 155–185 | 0.2 N | 111 mg | BB-K 103 the desired product |
| 4 | 204–221 | 0.3 N | 54 mg | BB-K 104 position isomer |
| 5 | 225–265 | 0.5 N | 53 mg | BB-K 105 diacylated compound |
| 6 | 282–285 | 1.0 N | 20 mg | BB-K 106 diacylated compound |
| 7 | 286–289 | 1.0 N | 7 mg | BB-K 107 diacylated compound |
| 8 | 290–296 | 1.0 N | 31 mg | BB-K 108 diacylated compound |

The physio-chemical properties of these compounds are given in the following table.

| Compound | Mp (°C) | Rf (S-110, ninhydrin) | IR (KBr)γC=O |
| --- | --- | --- | --- |
| BB-K 102 | 187–193 | 0.39 | 1640 cm$^{-1}$ |
| BB-K 103 | 188–191 | 0.36 | 1640 cm$^{-1}$ |
| BB-K 104 | 191–198 | 0.37 | 1640 cm$^{-1}$ |
| BB-K 105 | 190–196 | 0.15 | 1640 cm$^{-1}$ |
| BB-K 106 | 179–184 | 0.16 | 1645 cm$^{-1}$ |
| BB-K 107 | 207–215 | 0.12 | 1645 cm$^{-1}$ |
| BB-K 108 | 189–196 | 0.11 | 1645 cm$^{-1}$ |

Microanalysis of BB-K 103

Calc'd for $C_{34}H_{64}N_6O_{20} \cdot 3H_2CO_3$. C, 41.81; H, 6.64; N, 7.91.

Found: C, 41.97; H, 6.78; N, 7.91.

All these BB-K compounds regenerated δ-amino-α-hydroxyvaleric acid and lividomycin A by hydrolysis with 0.5 N NaOH at 100° for an hour.

Amberlite CG-50 is the tradename for the chromatographic grade of weakly acidic cationic exchange resin of a carboxylic-polymethacrylic type.

Amberlite IR-120 is the tradename for a high density nuclear sulfonic acid type cationic exchange resin supplied in either hydrogen or sodium form as beads—16–50 mesh.

We claim:

1. A compound having the formula

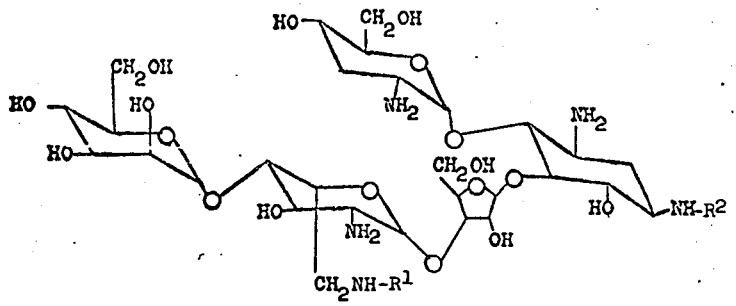

in which $R^1$ is H or

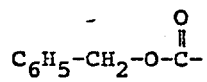

and $R^2$ is H, L-(−)-γ-amino-α-hydroxybutyryl, L-(−)-β-amino-α-hydroxypropionyl, L-(−)-γ-amino-α-hydroxyvaleryl, L-(−)-γ-benzyloxycarbonylamino-α-hydroxybutyryl, L-(−)-β-benzyloxycarbonylamino-α-hydroxypropionyl, or L-(−)-δ-benzyloxycarbonylamino-α-hydroxyvaleryl, wherein $R^1$ or $R^2$ must be other than H; or a nontoxic pharmaceutically acceptable acid addition salt thereof.

2. The compound of claim 1 wherein $R^1$ is

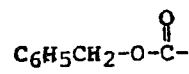

and $R^2$ is H.

3. The compound of claim 1 wherein $R^1$ is $C_6H_5CH_2-O-\overset{\underset{\|}{O}}{C}-$ and $R^2$ is L-(−)-γ-benzyloxycarbonylamino-α-hydroxybutyryl, L-(−)-β-benzyloxycarbonylamino-β-hydroxypropionyl or L-(−)-δ-benzyloxycarbonylamino-α-hydroxyvaleryl.

4. The compound of claim 1 wherein $R^1$ is H and $R^2$ is L-(−)-γ-amino-α-hydroxybutyryl, L-(−)-β-amino-α-hydroxypropionyl or L-(−)-δ-amino-α-hydroxyvaleryl; or a nontoxic pharmaceutically acid addition salt thereof.

5. The compound of claim 4 wherein $R^1$ is H and $R^2$ is L-(−)-γ-amino-α-hydroxybutyryl; or the mono- or disulfate salt thereof.

6. The compound of claim 4 wherein $R^1$ is H and $R^2$ is L-(−)-β-amino-α-hydroxypropionyl; or the mono- or disulfate salt thereof.

7. The compound of claim 4 wherein $R^1$ is H and $R^2$ is L-(−)-δ-amino-α-hydroxyvaleryl; or the mono- or disulfate salt thereof.

* * * * *

PO-1050
(5/69)

UNITED STATES PATENT OFFICE
CERTIFICATE OF CORRECTION

Patent No. 3,896,106      Dated July 22, 1975

Inventor(s) Takayuki Naito, Susumu Nakagawa and Soichiro Toda

It is certified that error appears in the above-identified patent and that said Letters Patent are hereby corrected as shown below:

In the Claims, please change Claim 3 to read:

3. The compound of claim 1 wherein $R^1$ is $C_6H_5CH_2-O-\overset{\overset{O}{\|}}{C}-$ and $R^2$ is L-(-)-γ-benzyloxycarbonylamino-α-hydroxybutyryl, L-(-)-β-benzyloxycarbonylamino-α-hydroxypropionyl or L-(-)-δ-benzyloxycarbonylamino-α-hydroxyvaleryl.

Signed and Sealed this sixteenth Day of September 1975

[SEAL]

Attest:

RUTH C. MASON
Attesting Officer

C. MARSHALL DANN
Commissioner of Patents and Trademarks